United States Patent [19]

Koezuka et al.

[11] Patent Number: 4,672,678
[45] Date of Patent: Jun. 9, 1987

[54] PATTERN RECOGNITION APPARATUS

[75] Inventors: Tetsuo Koezuka, Hachioji; Noriyuki Hiraoka, Tokyo; Hiroyuki Tsukahara, Atsugi; Masato Nakashima, Yokohama, all of Japan

[73] Assignee: Fujitsu Limited, Kawasaki, Japan

[21] Appl. No.: 746,629

[22] Filed: Jun. 19, 1985

[51] Int. Cl.[4] ............................................. G06K 9/64
[52] U.S. Cl. ......................................... 382/30; 382/33
[58] Field of Search ....................... 382/30, 33, 34, 37, 382/38, 14, 15

[56] References Cited

U.S. PATENT DOCUMENTS

3,182,290  5/1965  Rabinow ................................ 382/38
3,601,802  8/1971  Nakagame ............................. 382/34

Primary Examiner—Leo H. Boudreau
Attorney, Agent, or Firm—Staas & Halsey

[57] ABSTRACT

A pattern recognition apparatus includes an image input device for inputting an object pattern, an analog-digital converter for converting an analog image signal from the image input device to a binary signal, a frame memory for storing the binary signal, a pattern matching circuit which compares the signal stored in the frame memory with a template memory, a template matching circuit which compares character and image patterns in the template memory, and a featured template forming circuit which automatically forms mismatched portions of the character and image patterns as a featured template and registers the same therein.

8 Claims, 14 Drawing Figures

PATTERN RECOGNITION APPARATUS

BACKGROUND OF THE INVENTION

1. Field of the Invention

The present invention relates to a pattern recognition apparatus. In particular, it relates to an improved method for forming a featured template to be used when the patterns are compared and collated, and a method for weighting the feature template.

2. Description of the Related Art

In a conventional method for recognizing patterns, the object patterns are compared and collated with template patterns previously registered, and a decision is made that the template pattern having the least degree of mismatching (or most degree of matching) is identified as the object pattern.

The drawback to this type of pattern recognition is that there is poor discrimination between similar patterns. Namely, when very similar patterns are compared, incorrect recognition may occur. This is because there are only a few mismatching portions between the similar patterns, and the degree of mismatching between the object pattern and the template pattern in a similar pattern category is low and the same as the degree of mismatching caused by an imperfection or quantum error in the object pattern itself.

To remove the above-mentioned drawbacks, the following method is used. That is, the different portions between the similar patterns are registered as the featured patterns and then are carefully compared and collated (i.e., weighted) with the object pattern to improve the recognition accuracy. However, in this method, it is necessary to obtain the feature points between the similar pattern pairs and to preform the feature template.

SUMMARY OF THE INVENTION

An object of the present invention is to provide a pattern recognition apparatus which can prevent mistakes in the recognition of and between similar characters or patterns.

Another object of the present invention is to provide a pattern recognition apparatus which can carry out the recognition process easily and simply.

The above-mentioned objects can be achieved by providing a pattern recognition apparatus comprising: an image input device which inputs the image of an object pattern; an analog-digital converter which converts an analog image signal from the image input device to a binary signal; a frame memory which stores the binary signal; a pattern matching circuit which compares the signal stored in the frame memory with a template pattern of a template memory; a template matching circuit which compares all template patterns of character and image patterns in the template memory with each other; and a featured template forming circuit which automatically forms mismatched portions between the template pattern pairs as a featured template and registers the same therein.

Further features and advantages of the present invention will be apparent from the ensuing description with reference to the accompanying drawings to which, however, the scope of the invention is in no way limited.

DESCRIPTION OF THE PREFERRED EMBODIMENTS

Figure 1:
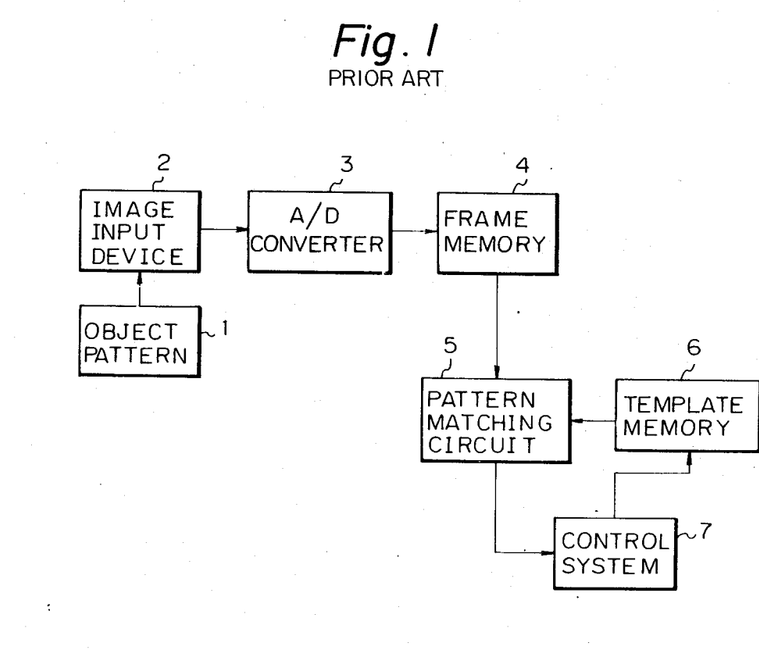
FIG. 1 is a block diagram showing a conventional recognition apparatus.

FIG. 1 is a block diagram of a conventional pattern recognition apparatus. In FIG. 1, the image of an object pattern 1 is picked-up by an image input device 2, and the picked-up analog video signal is converted to a digital signal in an analog-digital converter 3 and stored in a two-dimensional frame memory 4. Subsequently, template patterns stored in a template memory 6 and the digitized object pattern stored in the frame memory 4 are compared and collated in a pattern matching circuit 5, and the template pattern having the least mismatching is judged to be the object pattern. This operation is controlled by a control system 7.

In the actual comparing and collating operations between patterns, to decrease quantum errors, etc. in the object pattern, the template making from the original image itself is not used as the template. Instead a broad template in which the original patterns are broad and a narrow template in which the original patterns are narrow are used for this purpose. Further, to increase the accuracy of the discrimination, the object patterns are collated with the featured template.

When the pattern matching is carried out by using these templates, the mismatching degree between the object pattern and the broad pattern, the mismatching degree between the object pattern and the narrow template, and the mismatching degree between the object pattern and the featured template, which is multiplied by a weighting factor, are obtained. The total of these mismatching degrees are used for identification of the object pattern.

The accuracy of the pattern recognition apparatus is determined by the template pattern used in the comparison and collation operation, and therefore, it is important that a good template pattern and featured template patterns be formed. However, the number of patterns used for forming the featured template is large since it is a combination of each of the template patterns. When forming the featured template, the combination of similar patterns is decided by the operator, and the portions between the similar patterns to be featured are selected by the operator.

Accordingly, in the above-mentioned method, the featured template is not formed by a qualitative reference, so that it is vague and, at the same time, requires a large number of processes. Therefore, the required complete featured template cannot be formed.

Figure 2:
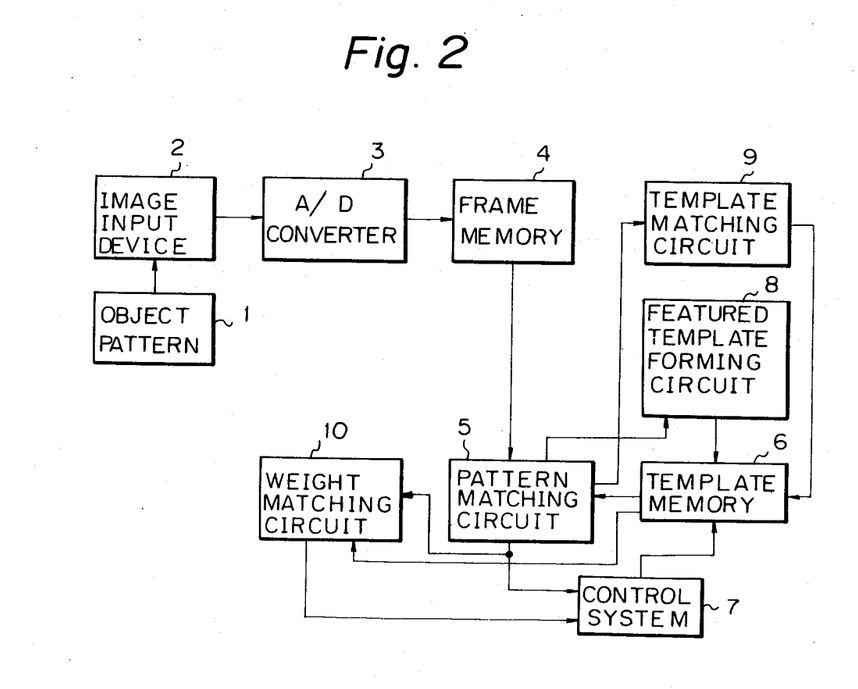
FIG. 2 is a block diagram showing one embodiment of the pattern recognition apparatus according to the present invention.

FIG. 2 is a block diagram of one embodiment of the present invention. In FIG. 2, the image of the object pattern is picked-up by an image input device 2, and the picked-up analog video signal is converted to a digital signal in an analog-digital converter 3 and stored in a two-dimensional frame memory 4. Subsequently, a template pattern stored in a template memory 6 and the digitized object pattern stored in the frame memory 4 are compared and collated in a pattern matching circuit 5, and the template pattern having the least mismatching is judged to be the object pattern. This operation is controlled by a control system 7, and is substantially the same as that in the conventional apparatus shown in FIG. 1.

In the present invention as shown in FIG. 2, however, a template matching circuit 9 is provided for forming the featured template. The template matching circuit 9 sends instructions to the template memory 6 to commence the matching of similar template patterns. Thus, the template patterns are compared and collated for all combinations of the template patterns registered in the template memory 6, and which circuit 9 which then selects the similar template pattern pairs. Namely, the degree of mismatching between the template patterns is equal to that registered in the template memory 6, which is smaller than the predetermined reference.

Regarding the combination of similar patterns which are selected at a predetermined reference in the pattern matching circuit 5, the mismatched portions between the similar templates are sent to a featured template forming circuit 8, and the featured templates are formed by the mismatched portions of the similar template pattern pairs. These featured templates are registered in the template memory 6.

In the pattern recognition apparatus according to the present invention, when the object pattern and the featured template pattern formed by the template matching circuit 9 and the featured template forming circuit 8 are compared and matched by pattern matching circuit 5, the number of mismatched bits for carrying out the comparison is counted and the number of mismatched portions observed by the comparison of the object pattern with the template pattern is added to the counted result and the object pattern is judged by control system 7. The number of mismatched bits relating to the features of the featured templete are weighted by a weight matching circuit 10 having an input from template memory 6 and an output to control system 7.

Figure 3:
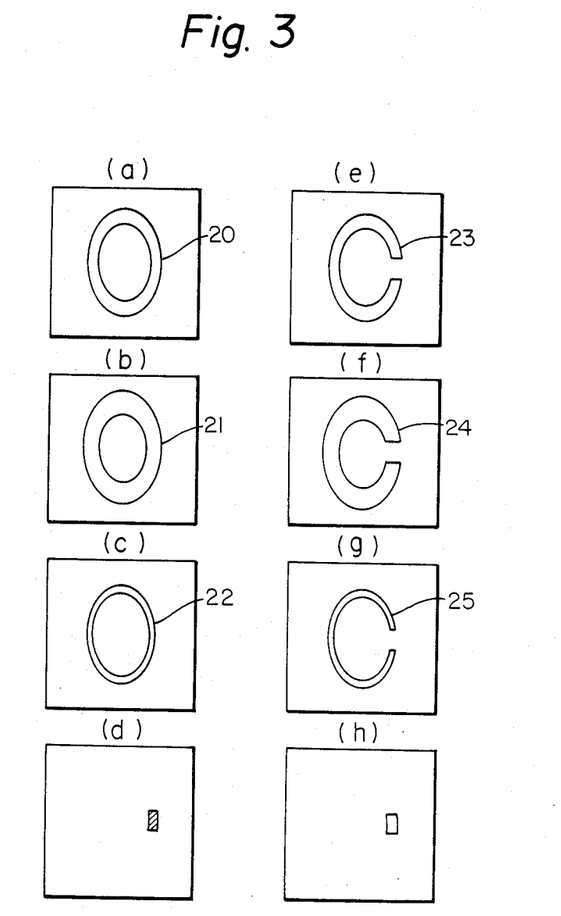
FIG. 3 is a diagram for explaining the template patterns.

Next, the method for forming the featured template will be explained using the characters "O" and "C" as examples. FIG. 3 shows the relationships between the original patterns, the broad templates, the narrow templates, and the featured templates. In FIG. 3, FIG. 3(a) shows the original pattern 20 of the character O, and FIGS. 3(b) and (c), respectively, show the broad template 21 and the narrow template 22 of the character O. These patterns in FIGS. 3(b) and (c) are automatically formed from the original pattern shown in FIG. 3(a). The pattern in FIG. 3(d) shows a featured template of the character O when the character O is matched with the character C. Also, in FIG. 3, FIG. 3(e) shows the original pattern 23 of the character C, and FIGS. 3(f) and (g) show the broad template 24 and the narrow template 25 of the character C. These patterns in FIGS. 3(f) and (g) are automatically formed from the original pattern shown in FIG. 3(e). The pattern in FIG. 3(h) shows a featured template of the character C when the character C is matched with the character O.

Figure 4A:
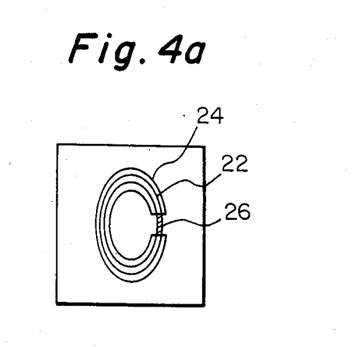
FIGS. 4A–4C are diagrams showing the process for forming the featured template.
Figure 4B:
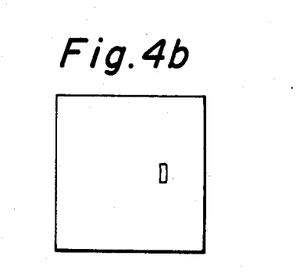
Figure 4C:
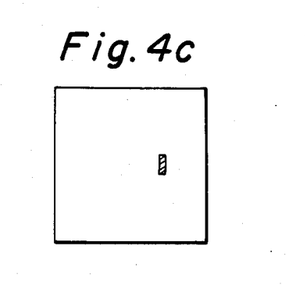

FIGS. 4A–4C are diagrams explaining the process of forming the featured template. When forming the featured template, the broad template 24 of the character C and the narrow template 22 of the character O are matched as shown in FIG. 4A, and a portion 26 of the narrow template 22 of the character O which does not match the broad template 21 of the character C is registered as the feature of the background part for the featured template of the character C, as shown in FIG. 4B, and is also registered as the feature of the character part for the featured template of the character O as shown in FIG. 4(C). In the above-mentioned description, the explanation concerns only the character O and the character C; however, in other combinations of characters, similar comparing and matching operations are carried out for only the combination of similar template patterns in which the number of mismatched portions is smaller than the predetermined portions.

Figures 5, 5A:
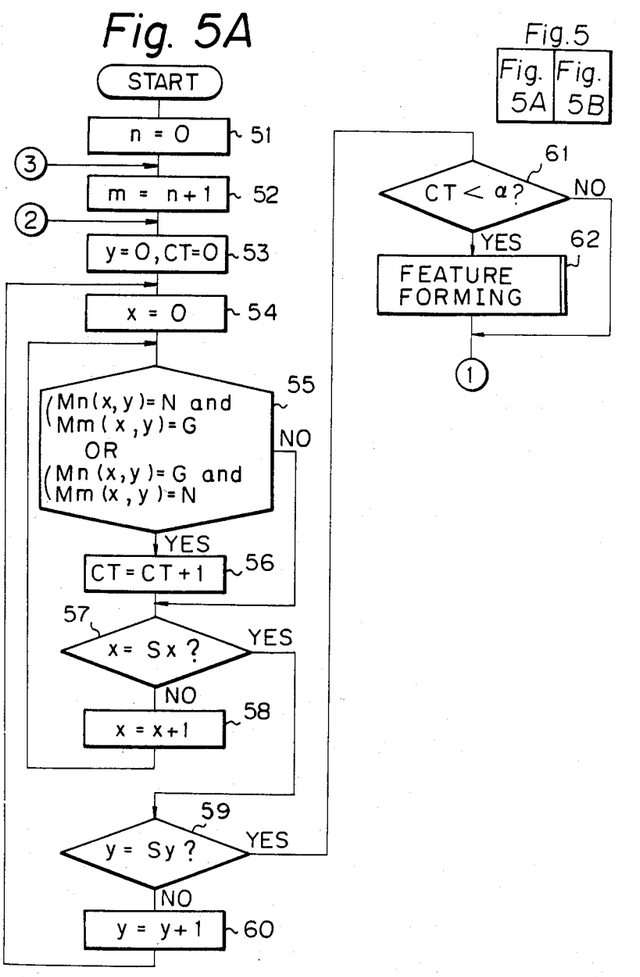
FIGS. 5A and B, and FIG. 6 are flow charts for explaining the process for forming the featured template shown in FIG. 4.
Figure 5B:
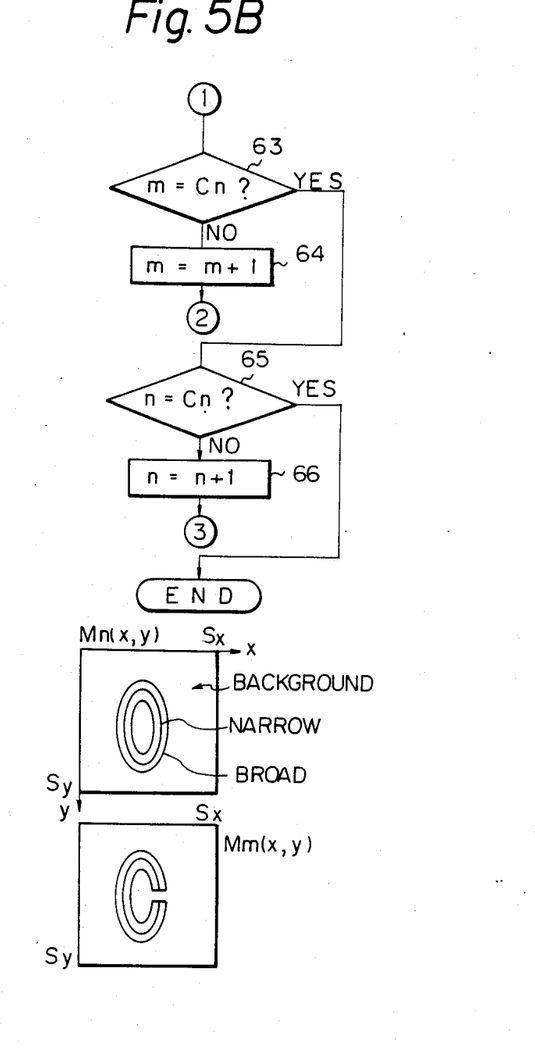

FIG. 5 is a flow chart showing the algorithm for forming the featured template. In FIG. 5, for example, Mm(x, y) represents the character C, and Mn(x, y) represents the character O. In FIG. 5, block 51 is an object template which includes the broad template and the narrow template. The object template in block 51 is compared with all other registered templates in block 52. In block 53, the horizontal direction of the template is scanned and a mismatch counter CT is counted. Next, in block 54, the vertical direction of the template is scanned. In block 55 a comparison is made between the broad template of O and the narrow template of C and also between the broad template of C and the narrow template of O, and it is determined whether the condition Mn(x, y) is narrow character part and Mm(x, y) is the background part, or whether Mn(x, y) is the background part and Mm(x, y) is narrow character part. When the desired condition is satisfied in block 55, the mismatch counter CT is counted up in block 56. When the desired conditions is not satisfied in block 55, the output of block 55 is supplied to block 57 and transfers to the next scanning. A similar operation is repeated for the horizontal and vertical directions in blocks 57, 58, 59, and 60. Block 61 judges whether or not the output of block 59 signifies a similar character.

The degree of mismatching $Q_{mn}$ of images corresponding to the object template Mm(x, y) and the other object template Mn(x, y) are determined by the following equation.

$$Q_{mn1} = \sum_{\substack{x=0 \\ y=0}} \overline{Mm1(x, y)} \text{ and } Mn1(x, y)$$

$$Q_{mn2} = \sum_{\substack{x=0 \\ y=0}} Mm2(x, y) \text{ and } \overline{Mn1(x, y)}$$

$$Q_{mn} = Q_{mn1} + Q_{mn2}$$

wherein, Mm1(x, y) and Mn1(x, y) represent a broad template and Mm2(x, y) and Mn2(x, y) represent a narrow template.

This degree of the mismatching is compared with a predetermined constant α.

After the feature of one pair is formed, the process is transferred via blocks 63, 64, 65, and 66 to the next template.

Figure 6:
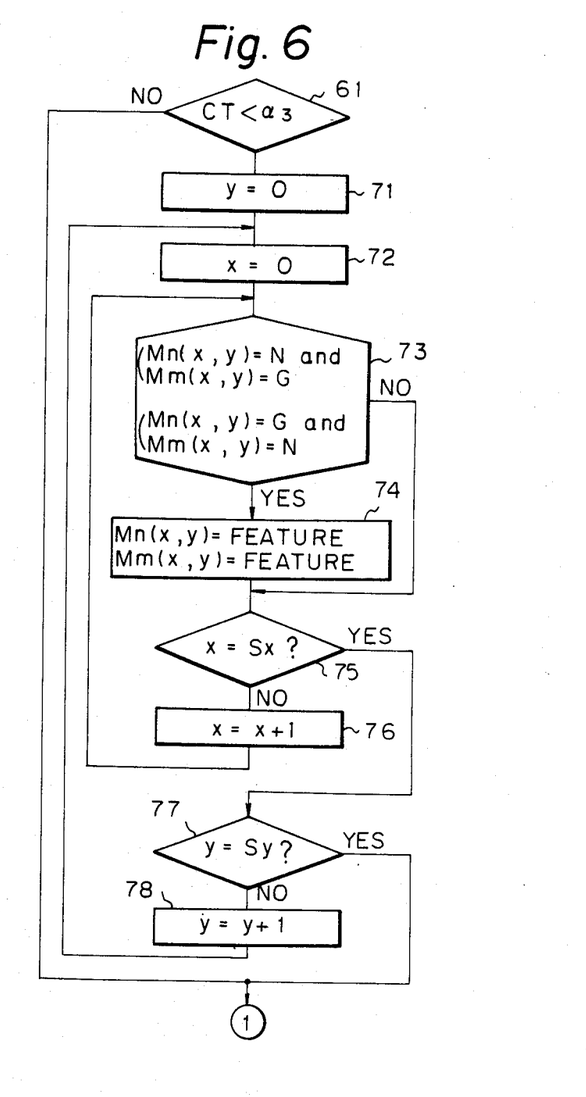

FIG. 6 is the flow-chart showing the algorithm of the feature forming in block 62 in FIG. 5. In FIG. 6, blocks 71 to 78 show a similar operation to that shown in FIG. 5.

Figure 7:
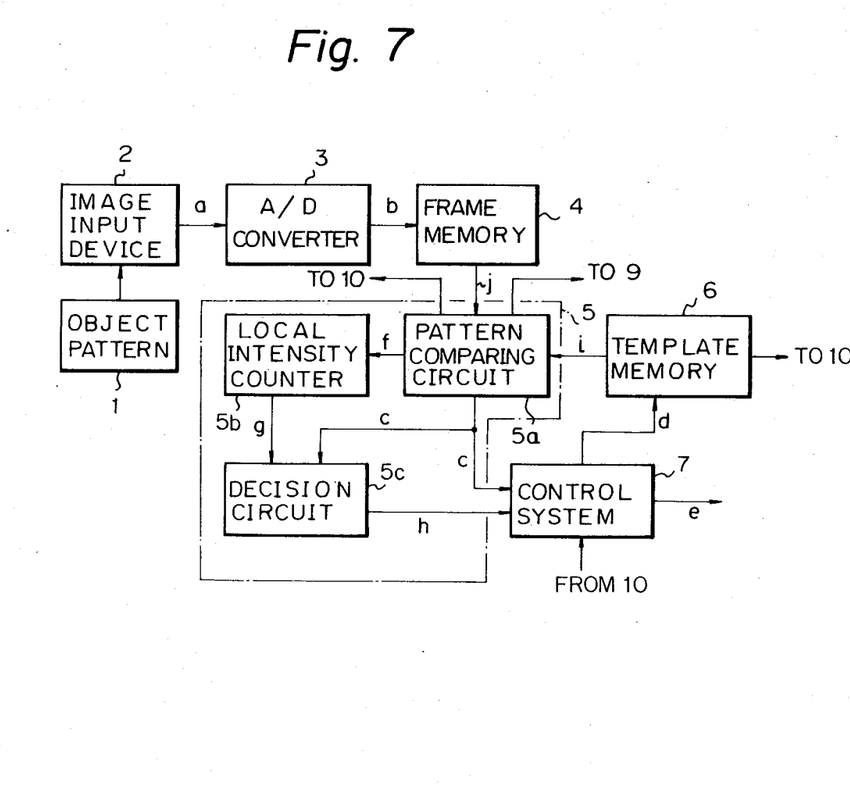
FIG. 7 is a block diagram showing in detail a pattern matching circuit shown in FIG. 2.
Figure 8:
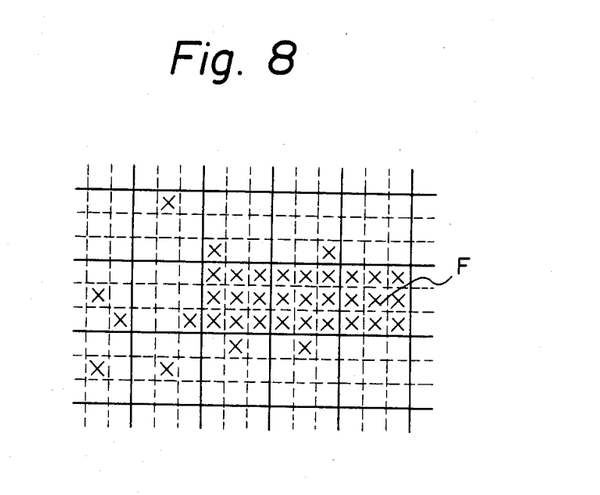
FIG. 8 is a diagram showing a sub-matrix in a local density counter shown in FIG. 7.

FIG. 7 is the block diagram of the pattern recognition apparatus in which the pattern matching circuit 5 in FIG. 2 is shown in further detail. In FIG. 7, the image of the object pattern 1 is picked-up by an image input device 2, and the picked-up analog video signal (a) is converted to a digital signal (b) in an analog-digital converter 3 and stored in a two-dimensional frame memory 4. The template memory 6 previously stores a great many template patterns which are used for reference. The object pattern (j) stored in the frame memory 4 and the template pattern (i) stored in the template memory 6 are matched and compared in a pattern comparing circuit 5a. The pattern comparing circuit 5a counts the number of mismatched bits between the object pattern (j) and the template pattern (i), and outputs the degree of the mismatching portions (c). Further, the pattern comparing circuit 5a divides the patterns which are obtained by matching and comparing the object pattern (j) and the template pattern (i), shows the degrees of matching or mismatching as bit units, for example, a submatrix of 3 bits×3 bits, and inputs this discrimination to a local intensity counter 5b as a local pattern (f). FIG. 8 is a schematic diagram of the above-mentioned submatrix. In FIG. 8, X designates a mismatching bit and the solid lines designate a boundary of the submatrix forming a local pattern (f). The local patterns (f) are input in order to the local density counter 5b with the unit of the submatrix, and the number of local patterns (f) in which all bits in the submatrix are in a mismatching stage (as shown by F in FIG. 8) are counted. In FIG. 8, three such local patterns (f) exist. A decision circuit 5c (FIG. 7) carries out a judgement (h) based on the degree of the mismatching portions (c) and the counted value of the density (g) received from the local intensity counter 5b.

Figure 9A:
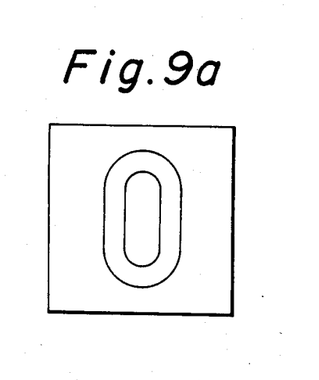
FIGS. 9A and 9B are diagrams explaining the judging operation according to the present invention.
Figure 9B:
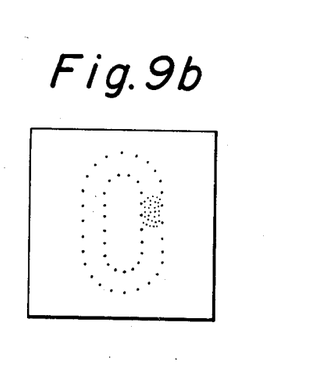

FIGS. 9A and B are diagrams explaining the judging operation according to the present invention. FIG. 9A shows the template pattern (alphabetic character O), and B shows a distribution of the mismatching bits when the object pattern is alphabetic character C. In FIG. 9B, mismatching bits are represented by black dots. As is clear from FIG. 9, if the number of mismatching bits is similar, and the template pattern is different from the object pattern, a region is formed wherein the mismatching bits become locally concentrated. The present invention utilizes this phenomenon in such a manner that, when a region is formed in which the mismatching bits are locally concentrated, it is judged that the template pattern does not coincide with the object pattern.

That is, when the number of mismatching bits is designated as A, the number of the submatrix wherein all bits are mismatched (as shown in FIG. 8) is designated as B, the criterion standard is designated as S, and when the following equation is satisfied, it is judged that the template pattern is not equal to the object pattern.

A+nB≧S (n: coefficient)

For example, B≧1 in the case of FIG. 9B. Therefore, a pattern for a character which is difficult to judge can be judged merely by easy recognition of the number of mismatching bits.

As shown in FIG. 7, the result of the judgement (h) thus obtained is sent to the control system 7. When the template pattern is judged to be equal to the object pattern in the control system 7, the control system 7 generates the output (e) giving the result of the judgement. When the template pattern is judged to be not equal to the object pattern, the control system 7 outputs the command (d) to the template memory 6 to output the next template pattern.

Figure 10:
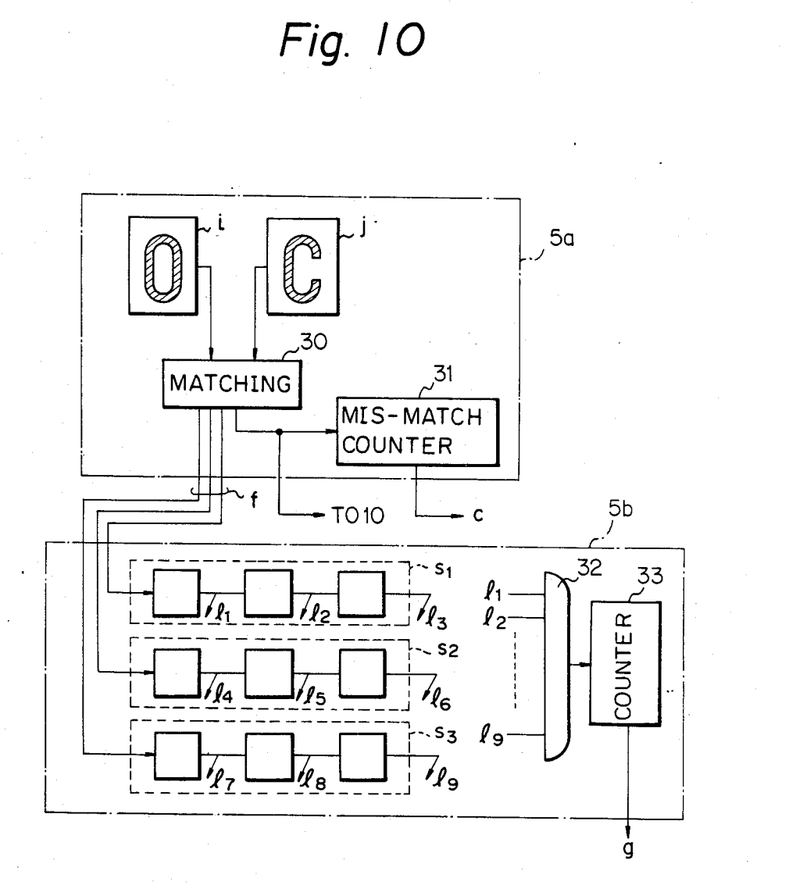
FIG. 10 is a block diagram of a pattern comparing circuit and a local intensity counter shown in FIG 7.

FIG. 10 is a block diagram of one embodiment of the decision circuit mentioned above comprising the pattern comparing circuit 5a and local intensity counter 5b shown in FIG. 7. In FIG. 10, 30 is a matching circuit, 31 a mismatching dot counter, 32 an AND gate, 33 a counter, $S_1$ to $S_3$ shift registers, and $l_1$ to $l_9$ the outputs of each stage of the shift registers $S_1$ to $S_3$. In the embodiment of the present invention, three shift registers $S_1 \sim S_3$ are used and the data of the 3×3 bits submatrix is loaded to these shift registers in order. When the data of the submatrix is loaded, the outputs $l_1$ to $l_9$ of each stage of the shift registers $S_1$ to $S_3$ are input to the AND gate 32. When all bits in the submatrix are mismatched bits, the output of the AND gate 32 counts up the counter 33.

In the above-mentioned embodiment, shift registers are used. However, the discrimination of the density of the distribution of the mismatching bits is not limited to shift registers. For example, a frequency filter may be used after an image transformation (space frequency image) by fourier transformation.

As mentioned above, the characters which cannot be discriminated (such as "O" and "C") by the conventional method can be discriminated in high recognition rate.

We claim:
1. A pattern recognition apparatus comprising:
an image input device which inputs an image pattern to be recognized and produces an analog image signal;
an analog-digital converter which receives the analog image signal from said image input device and converts the analog signal to a binary signal;
a frame memory which receives the binary signal from said converter and stores said binary signal;
a template memory for storing templates of different image patterns;
a pattern matching circuit which compares the signal stored in said frame memory with the template patterns in said template memory;
a template matching circuit which compares the template patterns in said template memory with each other and selects similar template pattern pairs; and
a featured template forming circuit which automatically forms mismatched portions of said template pattern pairs as a featured template and registers the featured template.

2. A pattern recognition apparatus according to claim 1, wherein the mismatched portions of said template pattern pairs having a degree of mismatching lower than a predetermined value are formed as said featured template.

3. A pattern recognition apparatus according to claim 1, wherein said templates in said template memory comprise a broad template category in which the template patterns are broad, a narrow template category in which the template patterns are narrow, and a featured template category in which the portions of said narrow template patterns that do not match said broad template patterns are registered as background features of said broad template patterns and image features of said narrow template patterns.

4. A pattern recognition apparatus according to claim 3, further comprising a weight matching circuit which weights said features of said featured template.

5. A pattern recognition apparatus according to claim 1, wherein the pattern which includes all mismatched parts of a pattern comparing all other image patterns is used as said featured template.

6. A pattern recognition apparatus according to claim 1, wherein said pattern matching circuit comprises a pattern comparing circuit which compares the pattern to be recognized and a template pattern stored in said template memory and forms local patterns showing the degree of mismatch or match therein as bits, a local density counter connected to a first output of said pattern comparing circuit for counting the number of local patterns in which the density of mismatch bits is high and a decision circuit connected to a second output of said pattern matching circuit and to an output of said local density counter for judging whether or not the pattern to be recognized and the template pattern being compared coincide.

7. A pattern recognition apparatus according to claim 6, wherein said pattern comparing circuit comprises a matching circuit, and a mismatching counter having an input connected to an output of said pattern matching circuit and an output connected to said decision circuit.

8. A pattern recognition apparatus according to claim 7, wherein said local density counter comprises a plurality of shift registers connected to outputs of said matching circuit, an AND gate connected to an output of each stage of said shift registers, and a counter having an input connected to an output of said AND gate and an output connected to said decision circuit.

* * * * *

UNITED STATES PATENT AND TRADEMARK OFFICE
CERTIFICATE OF CORRECTION

PATENT NO. : 4,672,678

DATED : June 9, 1987

INVENTOR(S) : Tetsuo Koezuka et al.

It is certified that error appears in the above-identified patent and that said Letters Patent is hereby corrected as shown below:

Column 6, lines 15 and 21, "$1_1$ to $1_9$" should read -- $\ell_1$ to $\ell_9$ --.

Signed and Sealed this

Twenty-sixth Day of April, 1988

Attest:

DONALD J. QUIGG

*Attesting Officer*    *Commissioner of Patents and Trademarks*

UNITED STATES PATENT AND TRADEMARK OFFICE
CERTIFICATE OF CORRECTION

PATENT NO. : 4,672,678

DATED : June 9, 1987

INVENTOR(S) : Koezuka et al.

It is certified that error appears in the above-identified patent and that said Letters Patent is hereby corrected as shown below:

Title page:

Please add the following:

[30] Foreign Application Priority Data

June 25, 1984 [JP] Japan              59-131717;

August 18, 1984 [JP] Japan            59-171765.

Signed and Sealed this

Twenty-third Day of August, 1988

Attest:

DONALD J. QUIGG

Attesting Officer          Commissioner of Patents and Trademarks